United States Patent
Qi et al.

(10) Patent No.: US 10,571,258 B2
(45) Date of Patent: Feb. 25, 2020

(54) POSITION SENSOR, CONVEYING DEVICE COMPRISING THE SAME, AND METHOD FOR POSITION CORRECTION BY USING THE SAME

(71) Applicants: BOE TECHNOLOGY GROUP CO., LTD., Beijing (CN); BEIJING BOE DISPLAY TECHNOLOGY GROUP CO., LTD., Beijing (CN)

(72) Inventors: Pengyu Qi, Beijing (CN); Dong Wang, Beijing (CN); Jian Hou, Beijing (CN)

(73) Assignees: BOE TECHNOLOGY GROUP CO., LTD., Beijing (CN); BEIJING BOE DISPLAY TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/565,392

(22) PCT Filed: Mar. 17, 2017

(86) PCT No.: PCT/CN2017/077061
§ 371 (c)(1),
(2) Date: Oct. 9, 2017

(87) PCT Pub. No.: WO2018/023978
PCT Pub. Date: Feb. 8, 2018

(65) Prior Publication Data
US 2019/0154438 A1 May 23, 2019

(30) Foreign Application Priority Data
Aug. 5, 2016 (CN) .......................... 2016 1 0635991

(51) Int. Cl.
*G01B 11/14* (2006.01)
*G01B 11/26* (2006.01)
*B65G 47/24* (2006.01)

(52) U.S. Cl.
CPC .............. *G01B 11/26* (2013.01); *B65G 47/24* (2013.01); *B65G 2201/02* (2013.01); *B65G 2811/0626* (2013.01)

(58) Field of Classification Search
CPC ..... G01B 11/026; G01B 11/002; G01B 11/14; G01S 5/163; G01S 5/16
(Continued)

(56) References Cited

U.S. PATENT DOCUMENTS 5,596,408 A * 1/1997 Cummins ............ G01N 21/532
356/339
5,708,633 A * 1/1998 Hollen .................... B23P 21/00
369/44.11

(Continued)

FOREIGN PATENT DOCUMENTS

CN 1228182 A 9/1999
CN 1363827 A 8/2002
(Continued)

OTHER PUBLICATIONS

Office Action received for Chinese Patent Application No. 201610635991.X, dated Apr. 3, 2018, 10 pages. (4 pages of English Translation and 6 pages of Office Action).
(Continued)

*Primary Examiner* — Md M Rahman
(74) *Attorney, Agent, or Firm* — Womble Bond Dickinson (US) LLP (57) ABSTRACT

The present application proposes an improved position sensor, a conveying device comprising the same and a method for position correction by using the same. The position sensor includes at least two light emitters, a light receiver array and a pedestal, the pedestal having a central plane and at least two sloping surfaces tilting towards a center of the pedestal at opposite edges, the at least two light
(Continued)

emitters being arranged on the at least two sloping surfaces respectively, and the light receiver array being arranged on the central plane of the pedestal.

19 Claims, 7 Drawing Sheets

(58) Field of Classification Search
USPC .......................................................... 356/614
See application file for complete search history.

(56) References Cited

U.S. PATENT DOCUMENTS

| | | | | |
|---|---|---|---|---|
| 5,966,486 | A * | 10/1999 | Boudreau | G02B 6/4224 385/89 |
| 6,200,531 | B1 * | 3/2001 | Liljestrand | G01N 21/69 250/361 C |
| 2003/0017034 | A1 * | 1/2003 | Davis | H01L 21/67173 414/404 |
| 2003/0138742 | A1 * | 7/2003 | Irie | G03F 7/201 430/396 |
| 2003/0174454 | A1 * | 9/2003 | Fu | G02B 6/4201 361/103 |
| 2004/0051881 | A1 | 3/2004 | Holzapfel et al. | |
| 2004/0066515 | A1 | 4/2004 | Ott | |
| 2005/0073422 | A1 * | 4/2005 | Graff | A47L 15/4293 340/641 |
| 2006/0139654 | A1 | 6/2006 | Takahashi et al. | |
| 2008/0098798 | A1 * | 5/2008 | Riley | A61M 5/365 73/19.03 |
| 2011/0117259 | A1 * | 5/2011 | Storek | A47J 36/14 426/509 |
| 2012/0170053 | A1 | 7/2012 | Kråkenes et al. | |
| 2012/0308877 | A1 * | 12/2012 | Hirai | H01M 2/024 429/184 |
| 2013/0133250 | A1 * | 5/2013 | Chan | B01D 21/262 47/1.4 |
| 2013/0138226 | A1 * | 5/2013 | Bleier | H03L 5/00 700/66 |
| 2014/0259510 | A1 * | 9/2014 | Conrad | A47L 13/225 15/319 |
| 2014/0316244 | A1 * | 10/2014 | Abe | A61B 5/0095 600/409 |
| 2015/0009509 | A1 | 1/2015 | Kim et al. | |
| 2015/0090900 | A1 * | 4/2015 | Banks | G01N 21/645 250/432 R |
| 2015/0191859 | A1 * | 7/2015 | Webster | D06F 37/42 68/12.06 |
| 2015/0273604 | A1 * | 10/2015 | Anderson | B23K 1/0056 228/102 |
| 2015/0368853 | A1 * | 12/2015 | Kulkarni | D06F 58/28 34/446 |
| 2016/0041038 | A1 * | 2/2016 | Geiger | G01J 5/046 250/338.1 |
| 2016/0163177 | A1 * | 6/2016 | Klicpera | E03B 7/071 137/59 |
| 2016/0258870 | A1 * | 9/2016 | Tokhtuev | G01N 33/18 |
| 2016/0340205 | A1 * | 11/2016 | Murdock | C02F 1/008 |
| 2016/0348297 | A1 * | 12/2016 | Scheckelhoff | D06F 39/088 |

FOREIGN PATENT DOCUMENTS

| | | |
|---|---|---|
| CN | 1459019 A | 11/2003 |
| CN | 1740738 A | 3/2006 |
| CN | 1793778 A | 6/2006 |
| CN | 102360252 A | 2/2012 |
| CN | 102498363 A | 6/2012 |
| CN | 102829722 A | 12/2012 |
| CN | 202649489 U | 1/2013 |
| CN | 103676244 A | 3/2014 |
| CN | 104204720 A | 12/2014 |
| CN | 105066915 A | 11/2015 |
| CN | 106052561 A | 10/2016 |
| DE | 102011109669 A1 | 5/2015 |
| EP | 0145836 A2 | 6/1985 |
| EP | 0985206 B1 | 3/2012 |
| KR | 10-1333299 B1 | 11/2013 |
| KR | 20140105872 A * | 9/2014 ........... G06F 3/0416 |

OTHER PUBLICATIONS

International Search Report and Written Opinion in PCT/CN2017/077061 dated May 27, 2017, with English translation.

* cited by examiner

POSITION SENSOR, CONVEYING DEVICE COMPRISING THE SAME, AND METHOD FOR POSITION CORRECTION BY USING THE SAME

RELATED APPLICATION

The present application is the U.S. national phase entry of PCT/CN2017/077061, with an international filling date of Mar. 17, 2017, which claims the benefit of priority from the Chinese application No. 201610635991.X filed on Aug. 5, 2016, the disclosure of which is incorporated herein by reference.

FIELD OF THE DISCLOSURE

At least an embodiment of the present disclosure relates to the field of position detection, and in particular to a position sensor, a conveying device comprising the same and a method for position correction.

BACKGROUND

Figure 1:
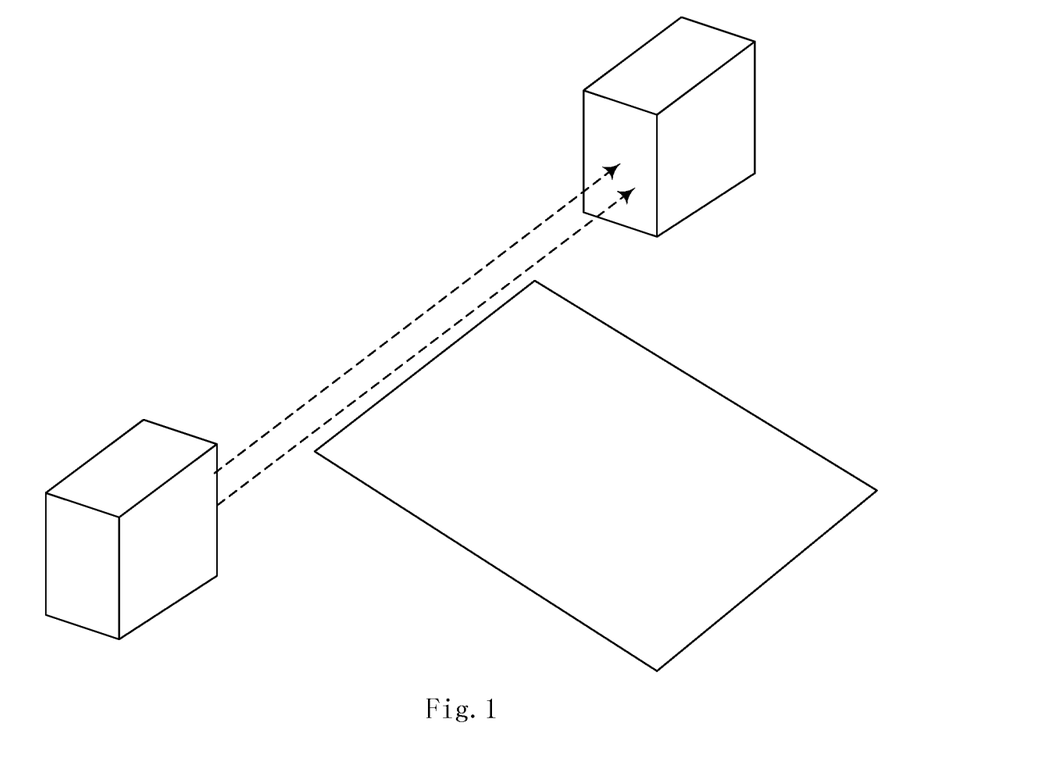
FIG. 1 shows a position detection device for detection a substrate position in the prior art.

In electronics field, especially in the field of liquid crystal panel manufacture, it is often necessary to convey for example a glass substrate between devices intended for different processes. During the conveyance of the glass substrate, it is easy to occur the substrate deviates the correct placement position, so the position of the substrate, especially whether the substrate is aligned, needs to be detected. In order to detect whether the substrate is aligned, it is particularly necessary to detect the position and the orientation of its edge. An existing position detection device usually has separate parts, for example a emitter and a receiver separated from each other (as shown in FIG. 1). The detection device detects based on signals given by a single emitter and a single receiver whether a substrate located therebetween is aligned. The detection device has a fixed position, which makes it difficult to carry out real-time measurement during the conveyance with satisfactory accuracy.

In addition, upon detection of deviation of the position of the substrate during the conveyance, the position of the substrate is often corrected through rigid adjustment of a device center position, which will easily result in damage to the substrate.

SUMMARY

In light of the above problems, the present application proposes an improved position sensor, a conveying device comprising the same and a method for position correction.

In an aspect, a position sensor is provided, comprising at least two light emitters, a light receiver array and a pedestal, the pedestal having a central plane and at least two sloping surfaces tilting towards a center of the pedestal at opposite edges, the at least two light emitters being arranged on the at least two sloping surfaces respectively, and the light receiver array being arranged on the central plane of the pedestal.

In an embodiment, the light emitters are configured to emit light waves having a same frequency perpendicular to respective sloping surfaces, such that the light waves from the light emitters interfere with each other before arriving at an object to be detected.

In an embodiment, the light emitters comprise columnar emitters.

In an embodiment, the light receiver array is configured to receive light wave components directly traveling downwards to the light receivers after the interference and/or light wave components reflected by the object to be detected above the position sensor.

In an embodiment, a position of the object to be detected is determined based on positions of light receivers receiving sharp light waves between light receivers receiving low intensity light waves and light receivers receiving high intensity light waves in the light receiver array.

In another aspect, a conveying device is provided, which comprises the position sensor mentioned above that is used for detecting an edge position of an object to be conveyed.

In an embodiment, the device is provided with at least three said position sensors, the at least three position sensors being arranged in two intersecting straight lines.

In an embodiment, the device comprises three said position sensors, two of them being configured to measure an offset of the object to be conveyed in a first direction, and the other being configured to measure an offset of the object to be conveyed in a second direction different from the first direction.

In an embodiment, two of the three position sensors are aligned with a standard position of an edge of the object to be conveyed on the device, and the other is aligned with a standard position of another edge of the object to be conveyed on the device.

In an embodiment, the conveying device is configured to make corresponding compensations by means of a movement trajectory of the conveying device during the conveyance based on the measured offsets.

In an embodiment, the conveying device is a robot having a robotic arm.

In yet another aspect, a method for position correction of an object to be detected by using the position sensor mentioned above, comprising steps as follows:
measuring offsets of at least three endpoints of the object to be detected by using the position sensor; calculating by using the offsets of the at least three endpoints offset values and offset angles of the object to be detected as a whole in a first direction and in a second direction different from the first direction; and calculating compensation values for the offset values and the offset angles.

In an embodiment, the position sensor is attached to a substrate conveying device, the object to be detected is a substrate, and the method further comprises: measuring offsets of the position of the substrate by using the position sensor respectively before and after an action of receiving the substrate by the substrate conveying device, before and after a displacement of the substrate and/or before and after an action of placing the substrate.

In an embodiment, the method further comprises adding the compensation values to a movement trajectory of the substrate conveying device so as to allow correction by the substrate conveying device.

In an embodiment, the method further comprises transmitting the offset values and the offset angles to a downstream device to which the object to be detected will be conveyed so as to allow correction by the downstream device.

In an optional embodiment, the offsets of the three endpoints are respectively $X_01$, $X_02$ and $Y_0$, and the offset values in a longitudinal direction and a transversal direction and the offset angle are respectively X, Y and $\theta$, and the step of calculating the offset values and the offset angle involves the following formula:

$X=(X_O1+X_O2)/2$; $Y=Y_O$; $\theta=(X_{O1}-X_{O2})/D$, wherein D is a distance between two position sensors configured to measure offsets of the object to be detected in the transversal direction.

BRIEF DESCRIPTION OF DRAWINGS

Drawings are included to provide further understanding of the embodiments and the drawings are incorporated into the description and constitute part of the description. The drawings illustrate the embodiments and are used for explaining in combination with the description the principle of at least one embodiment of the present disclosure. It will be easy to conceive other embodiments and many expected advantages of the embodiments, because they will be better understood with reference to the detailed description below. Elements in the drawings are not necessarily drawn to scale. A same reference sign refers to corresponding similar parts.

DETAILED DESCRIPTION OF EMBODIMENTS

In detailed description below, the drawings are referred to. The drawings constitute part of the detailed description, and are shown through explanatory embodiments that can carry out the present invention. In this regard, directional terms such as "top", "bottom", "left", "right", "up" and "down" are used with reference to orientations of the drawings for description. Since components in the embodiments can be located in several different orientations, the directional terms are used for illustrative purposes rather than limiting in any sense. It should be understood that other embodiments can be envisioned or the logic can be changed without departing from the scope of the present application. Therefore, the detailed description below should not be interpreted in a limiting sense, and the scope of the present application should be defined by the appended claims.

It should be understood that features in the embodiments described herein can be combined with each other, unless specified otherwise.

Figure 2:
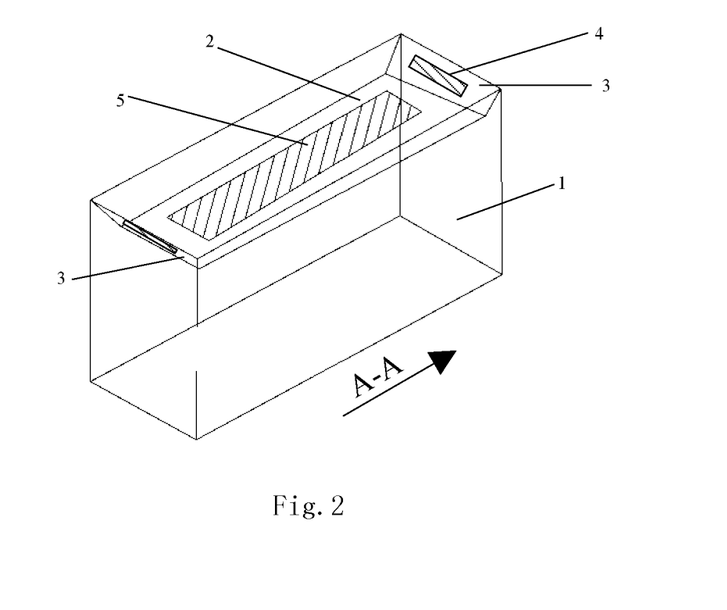
FIG. 2 shows a general structure of a position sensor according to an embodiment of the present disclosure.

FIG. 2 shows a general structure of a position sensor according to an embodiment of the present disclosure. The position sensor comprises a pedestal 1, the pedestal 1 comprising a central plane 2 and two sloping surfaces 3 tilting towards a center of the pedestal at edges on respective sides. A light emitter 4 is provided on each of the two sloping surfaces, such that light emitted from the two light emitters 4 can interfere with each other at a certain angle, thereby generating light wave components travelling upwards and downwards. A light receiver array 5 is provided on the central plane, and the light receiver array 5 can be in the form of a matrix or be arranged in a row, for sensing light wave components emitted directly from the light emitters 4 and/or light wave components reflected back by an object to be detected (which is not shown in the figure and located above the position sensor at a certain distance).

As can be seen, the emitter and the receiver of the position sensor according to the embodiment of the present disclosure are integrated in a same pedestal, thereby enabling single-ended measurement, which is notably advantageous over the existing dual-ended measurement. Besides, since the position sensor according to the embodiment of the present disclosure detects light within a certain range by means of the light receiver array 5, the position of the edge of the substrate under detection can be obtained accurately by comparing differences between signals received by each light receiver in the array, which makes it possible to derive the degree of position deviation of the substrate accurately.

Figure 3:
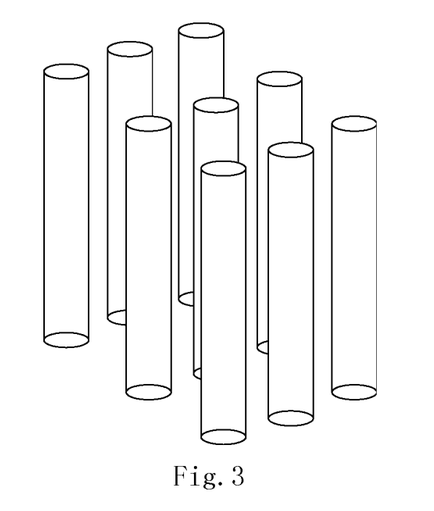
FIG. 3 shows an example of a light emitter.

In an embodiment, the pedestal 1 is in the shape of a cuboid in general. The central plane 2 is in the shape of a rectangle, so is the light receiver array 5. Besides, the length (i.e., the dimension between the two light emitters 4 along a direction A-A in FIG. 2) of the light receiver array 5 determines a detection range of the position sensor. Preferably, as shown in FIG. 3, the light emitters 4 are implemented as columnar emitters.

Figure 4:
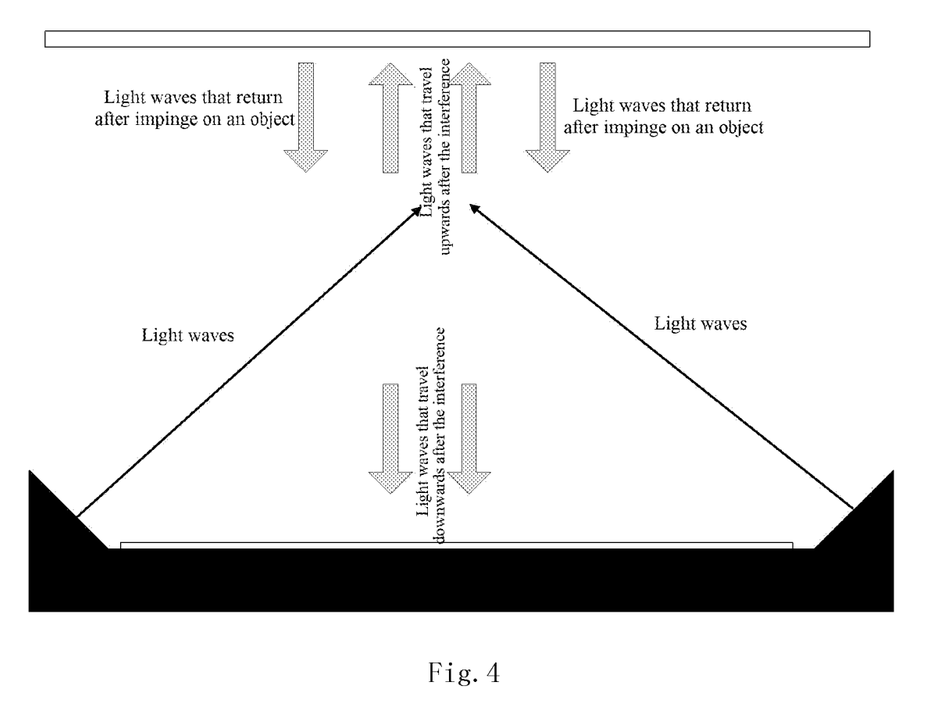
FIG. 4 shows in a schematic view for the operational principle of the position sensor according to an embodiment of the present disclosure.
Figure 5:
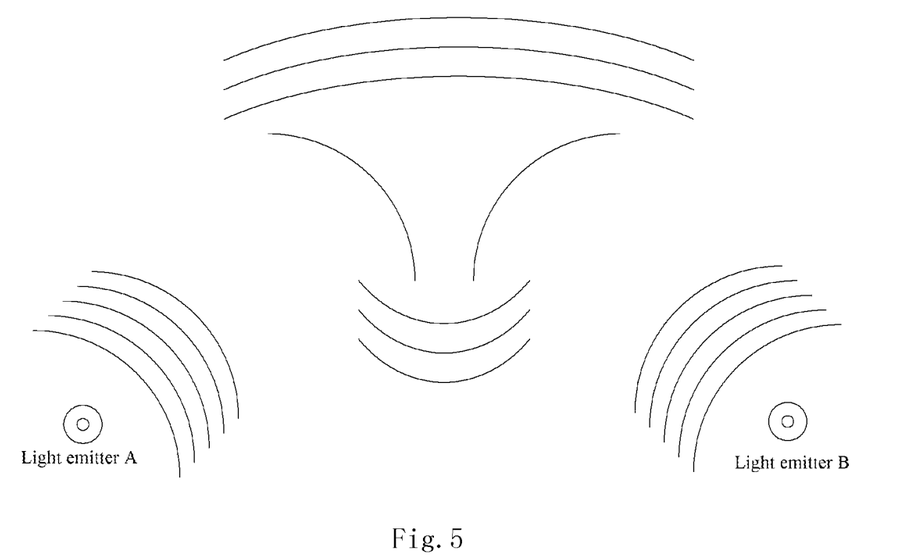
FIG. 5 schematically shows a procedure of light interference in FIG. 4.

FIG. 4 shows in a schematic view the operational principle of the position sensor according to an embodiment of the present disclosure. During the detection, light beams emitted from the two light emitters 4 interfere with each other before they arrive at a position of the glass substrate, and the following two major light wave components will be emitted out thereby: one is light wave component directly traveling downwards to the light receiver array, and the other is light wave component travelling upwards to a glass surface and reflected back. The procedure of light interference is shown more vividly in the schematic view of FIG. 5. In some embodiments, the interfered light beams may also generate light wave components in other directions, but this does go against the principle of the invention. Then, the position of the edge of the object (e.g., a glass substrate) to be detected is determined based on the intensity of light waves received by each light receiver in the light receiver array.

Figure 6:
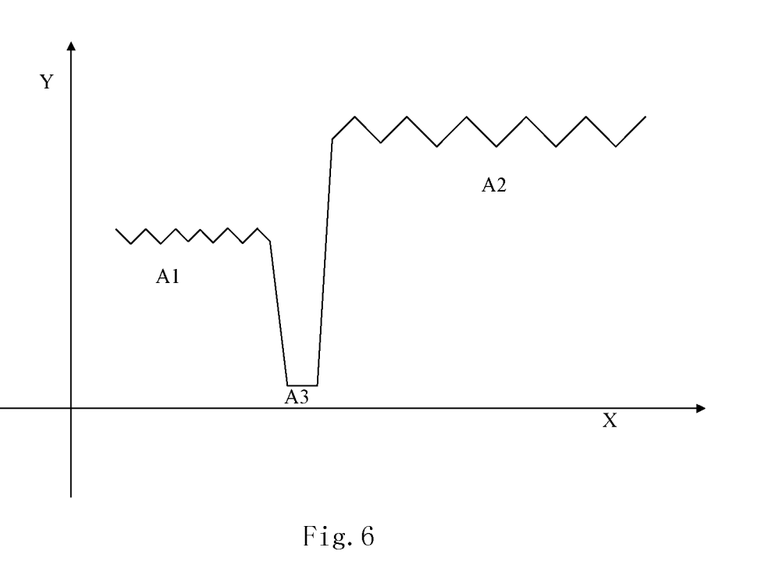
FIG. 6 schematically shows a waveform diagram of data measured upon detection of a substrate edge by using the position sensor according to an embodiment of the present disclosure.

FIG. 6 schematically shows a waveform diagram of data measured upon detection of a substrate edge by using the position sensor according to an embodiment of the present disclosure. The abscissa in FIG. 6 represents positions of the light receivers of the light receiver array (i.e., positions along the direction indicated by A-A in FIG. 2 or FIG. 9), and the coordinate represents amplitude of the light intensity received by the light receivers. Typically, in the presence of an edge of the glass substrate above the position sensor, the waveforms of the data by the light receiver array may have three segments. A first segment A1 has a lower light wave intensity, and a second segment A2 has a higher light wave intensity. The first segment A1 corresponds to light receivers having no object to be detected (i.e., the substrate) above them, i.e., it represents an intensity of light wave components directly travelling downwards to the light receivers after the interference. The second segment A2 corresponds to light receivers having an object to be detected (i.e., the substrate) above them, i.e., it represents an intensity of light waves superimposed by the light wave components directly travelling downwards to the light receivers after the interference and the light wave components travelling upwards and reflected back by the substrate. Between the first segment A1 and the second segment A2, there is a boundary region, i.e., a third segment A3, and the third segment A3 corresponds to an edge of the substrate. As compared with the first segment A1 and the second segment A2, the light wave intensity has quite a great change rate in the third segment A3. Although the amplitude in the third segment A3 is presented as a minimal value in FIG. 6, the amplitude in the third segment A3 can also have a maximal value. Therefore, the third segment A3 can also be called a sharp segment which changes greatly as compared with other segments. The sharp segment typically indicates the presence of an edge of an object above the light receivers.

Figure 7:
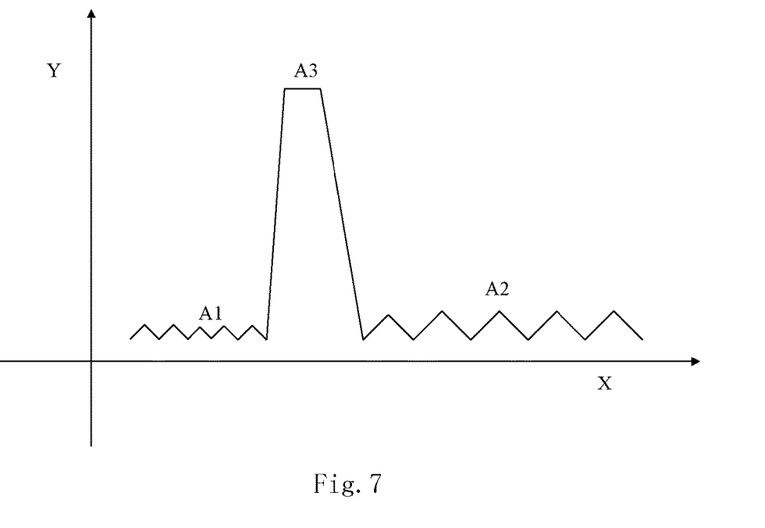
FIG. 7 shows a waveform diagram of differential of data measured by each light receiver in a light receiver array.

FIG. 7 shows a waveform diagram of differential of data measured by each light receiver in a light receiver array. A high-level segment of the waveform in FIG. 7 corresponds to the sharp segment mentioned above (i.e., a segment with a great change rate), and low-level segments correspond to the first segment and the second segment mentioned above, i.e., segments without a great change rate. From the waveform diagram of FIG. 7, the position of the edge of an object (i.e., the substrate) can be determined more easily.

It should be realized that although a substrate is used above as an example for explaining the operational principle of the position sensor, the position sensor can also be used for measuring an edge position of any object to be detected having an edge other than a substrate.

Figure 8:
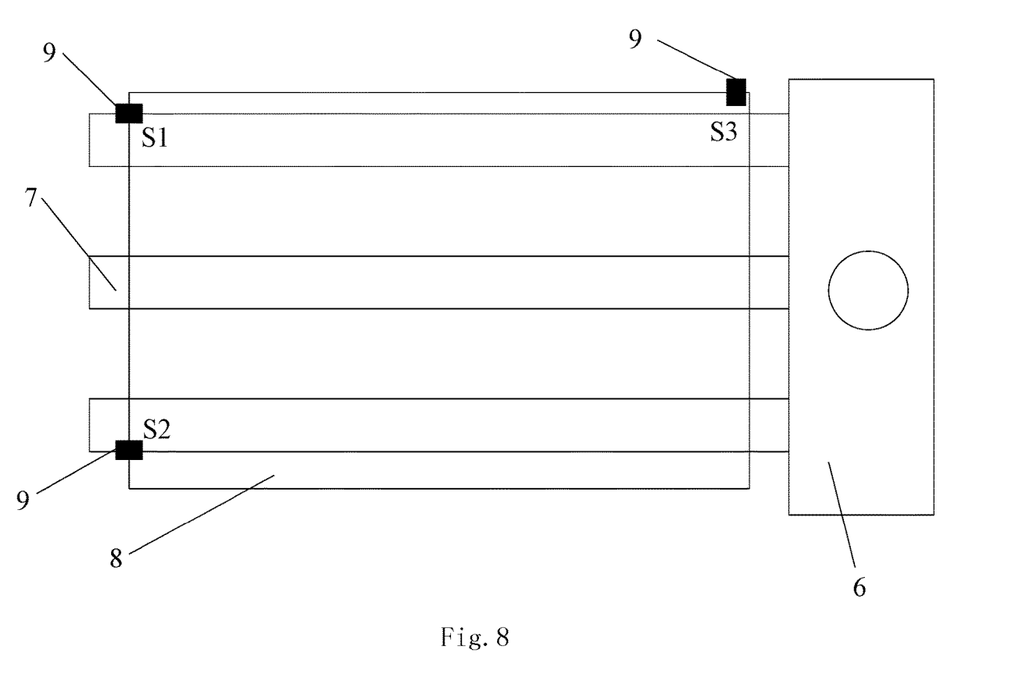
FIG. 8 schematically shows a substrate conveying device provided with a position sensor according to an embodiment of the present disclosure.

FIG. 8 schematically shows a substrate conveying device provided with a position sensor according to an embodiment of the present disclosure. The conveying device is provided with a base 6 and robotic arms 7, and the robotic arms 7 are used for supporting a substrate 8 to be conveyed (schematically indicated by a dashed box). The number of the robotic arms 7 on the conveying device is for example three, but it can also be other numbers. The conveying device is provided with several (e.g., three) position sensors mentioned above. In a specific example, three position sensors S1, S2 and S3 are placed respectively on the robotic arms or the base nearby (not shown) (depending on the position of the object to be detected), and in the form of a triangle arrangement (i.e., the position sensors are placed in two intersecting straight lines). The three position sensors are located respectively below standard positions for edges of the substrate (i.e., matched with three endpoints of the substrate). Two of the position sensors (e.g., S1 and S2) are located right below an edge of the substrate, and the other (e.g., S3) is arranged right below another edge of the substrate. Specifically, a central line of the light receiver array of the position sensor is aligned with the standard position of a substrate edge.

Figure 9:
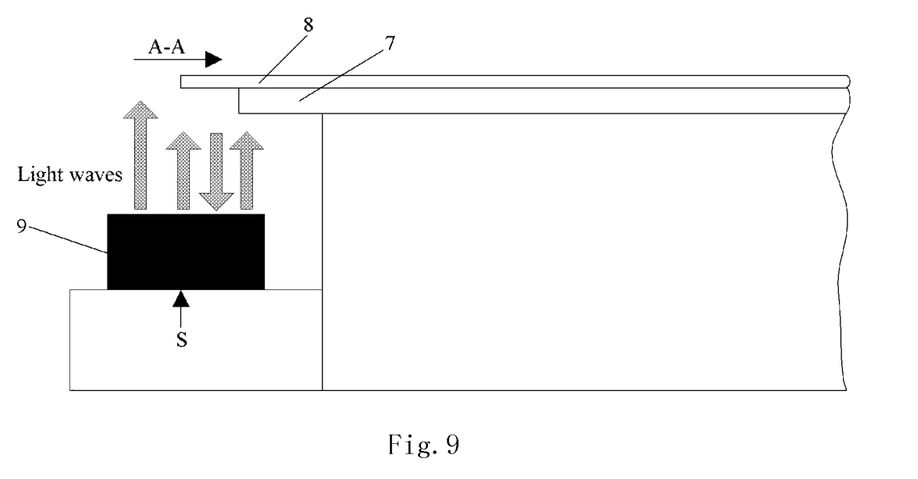
FIG. 9 schematically shows the operational principle of detecting a substrate edge by a position sensor 9 of the substrate conveying device according to an embodiment.

FIG. 9 schematically shows the operational principle of detecting a substrate edge by a position sensor 9 of the substrate conveying device according to an embodiment. Arrow S in FIG. 9 indicates a standard position with which an edge of the substrate should be aligned. Thereby, the position sensor can measure an offset of the substrate edge with respect to the standard position S.

Figure 10:
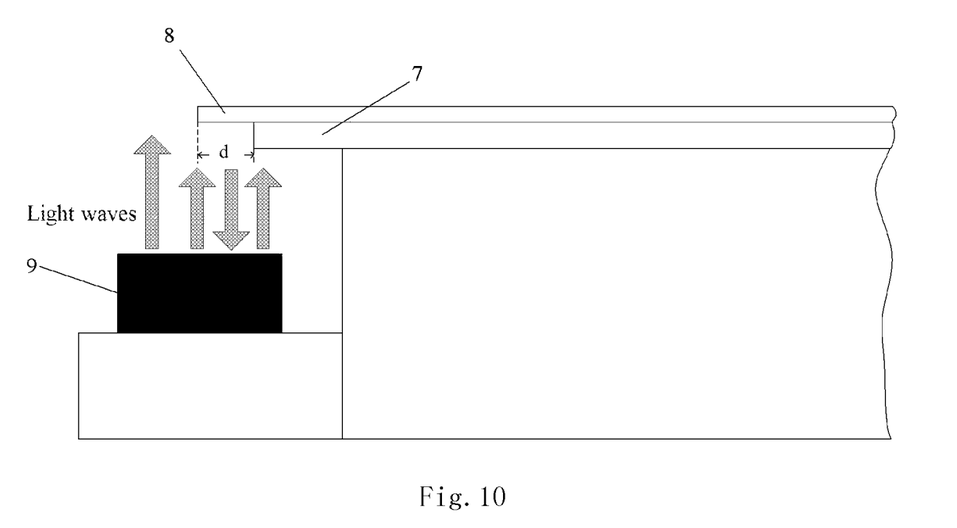
FIG. 10 schematically shows the operational principle of detecting a substrate edge by a position sensor of the substrate conveying device according to another embodiment.

FIG. 10 schematically shows the operational principle of detecting a substrate edge by a position sensor of the substrate conveying device according to another embodiment. As shown in FIG. 10, the position sensor 9 can be configured to determine a position of an edge of the substrate 8 by measuring a space d between the substrate edge and the robotic arms 7.

Referring back to FIG. 8, the three position sensors S1, S2 and S3 can measure offsets of three edge points on the substrate with respect to the standard position, namely $X_0 1$, $X_0 2$ and $Y_0$, for instance. The offset data has a positive or negative value corresponding to the offsets in two directions. In the arrangement as shown in FIG. 8, two of the position sensors are configured to measure an offset of the substrate in a first direction, and the other is configured to measure an offset of the substrate in a second direction. Thereby, the overall offset data of the substrate with respect to the standard position can be obtained by means of the three position sensors (which will be described below in detail).

It should be noted that the first direction is a direction where a long side of the substrate is located, which is also called a transversal direction for example. The second direction is a direction where a short side of the substrate is located, which is also called a longitudinal direction for example. This is also applicable to the embodiments below. However, the first direction and the second direction are not limited to the above definition, as long as the first direction and the second direction differ from each other to allow determination of the plane in which the substrate is located.

The substrate conveying device typically further comprises a controller or a processor for receiving signals transmitted by the position sensors, processing the signals to obtain corresponding offsets and performing corresponding calculations, and a memory for storing related data as well, which are not shown though. The controller or processor can be in the substrate conveying device, or remote from substrate conveying device.

Furthermore, it should be realized that the shape and the structure of the conveying device shown in FIG. 8 are not limiting, and the conveying device can have a shape and a structure other than those shown in FIG. 8.

The method for calculating the offset values (X, Y) and the offset angle θ of the substrate by using the above offset data through the following formula will be explained as follows with reference to FIG. 11.

$$X=(X_0 1+X_0 2)/2 \qquad (1)$$

$$Y=Y_0 \qquad (2)$$

$$\theta=\arctan(X_0 1-X_0 2)/D \qquad (3)$$

Figure 11:
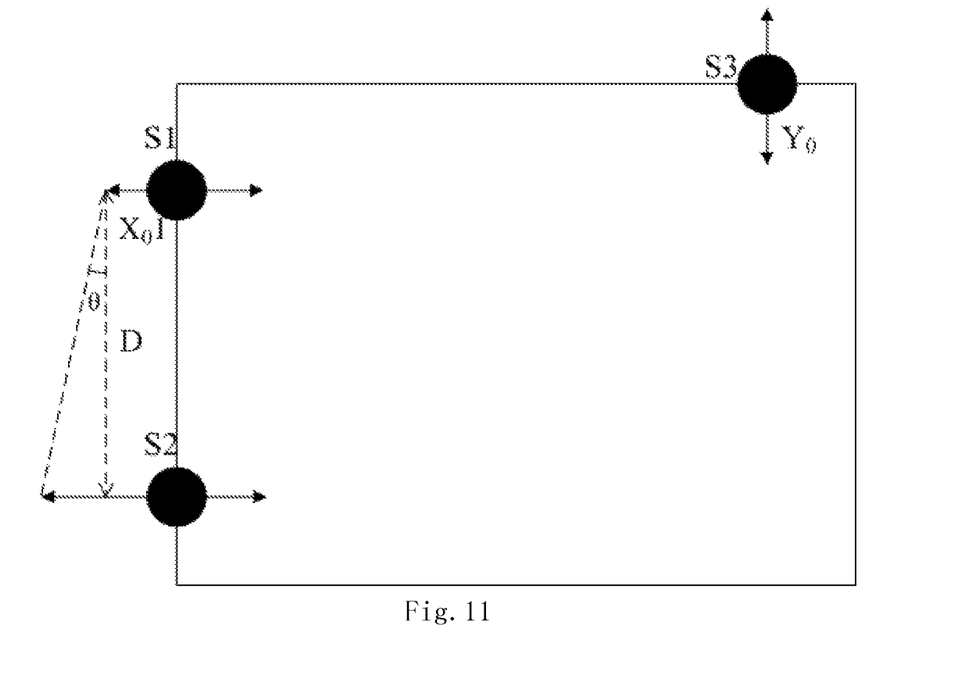
FIG. 11 schematically shows a way of calculating data of offset values of the substrate.

In the above formula, $X_0 1$ is a transversal offset of a first edge of the substrate detected by the sensor S1 in FIG. 11 with respect to the standard position; $X_0 2$ is a transversal offset of the first edge of the substrate detected by the sensor S2 in FIG. 11 with respect to the standard position; $Y_0$ is a longitudinal offset of a second edge of the substrate detected by the sensor S3 in FIG. 11 with respect to the standard position; D is a distance between the sensors S1 and S2.

Offset data (X, Y, θ) of the substrate obtained thereby can be transmitted to other devices for correcting deviation of the position for the substrate.

Figure 12:
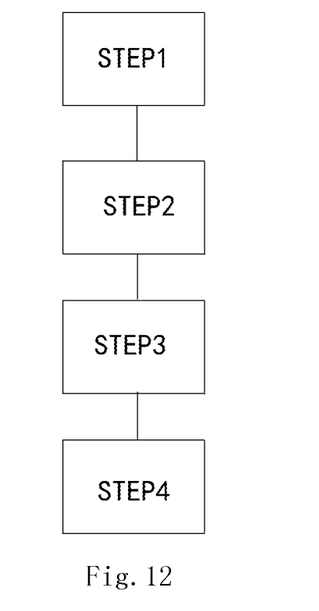
FIG. 12 shows a method for automatic correction to the substrate position by using the substrate conveying device according to an embodiment of the present disclosure.

FIG. 12 shows a method for automatic correction to the substrate position by using the substrate conveying device according to an embodiment of the present disclosure. The method comprises steps as follows: in step 1, position offsets of three endpoints of the glass substrate on the robotic arms are measured by using the position sensor arranged on the robotic arm. Then in step 2, offset values and offset angles of the substrate as a whole in a transversal direction and in a longitudinal direction are calculated by using the offsets of the three endpoints. In step 3, compensation values for the offset values and the offset angles are calculated, and then added to a movement trajectory of the substrate conveying device. In step 4, the substrate conveying device can convey the substrate based on the movement trajectory after addition of the compensation values so as to correct errors caused by placement of the substrate. For example, the substrate conveying device can move by a longer distance or a shorter distance transversally and longitudinally to correct the position offsets of the substrate in the transversal direction and in the longitudinal direction.

Figure 13:
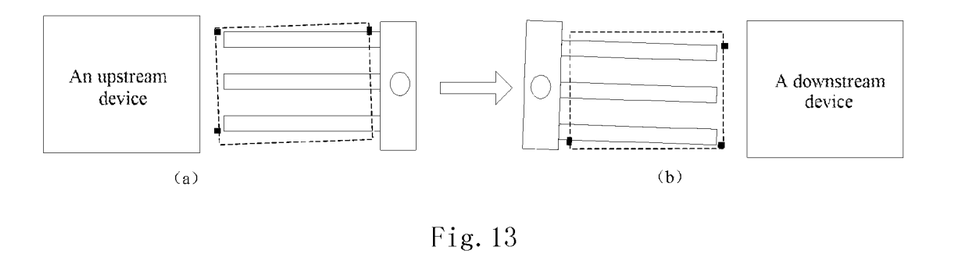
FIG. 13 schematically shows a procedure of correction made by the substrate conveying device in case of rotation of the substrate with respect to a standard position.

The procedure of correction will be illustrated below intuitionally by taking the case of FIG. 13 as an example where the substrate is rotated with respect to the standard position. As shown in part (a) of FIG. 13, when the conveying device receives a glass substrate from an upstream device, it detects deviation of the position of the glass substrate, for example, the substrate is rotated with respect to the robotic arms by a certain angle. Specifically, the conveying device utilizes the position sensors arranged on the robotic arms to measure position offsets of three endpoints of the glass substrate on the robotic arms. Then the controller in the conveying device or the controller configured to remotely control the conveying device calculates offset values and offset angles of the substrate as a whole in a longitudinal direction and in a transversal direction by using the offsets of the three endpoints. As shown in part (b) of FIG. 13, when the conveying device arrives at a downstream device to which the glass substrate will be conveyed, it makes appropriate correction or compensation (for example by rotating with respect to a horizontal direction), such that the glass substrate conveyed to the downstream device is restored to a standard orientation that it should have.

Figure 14:
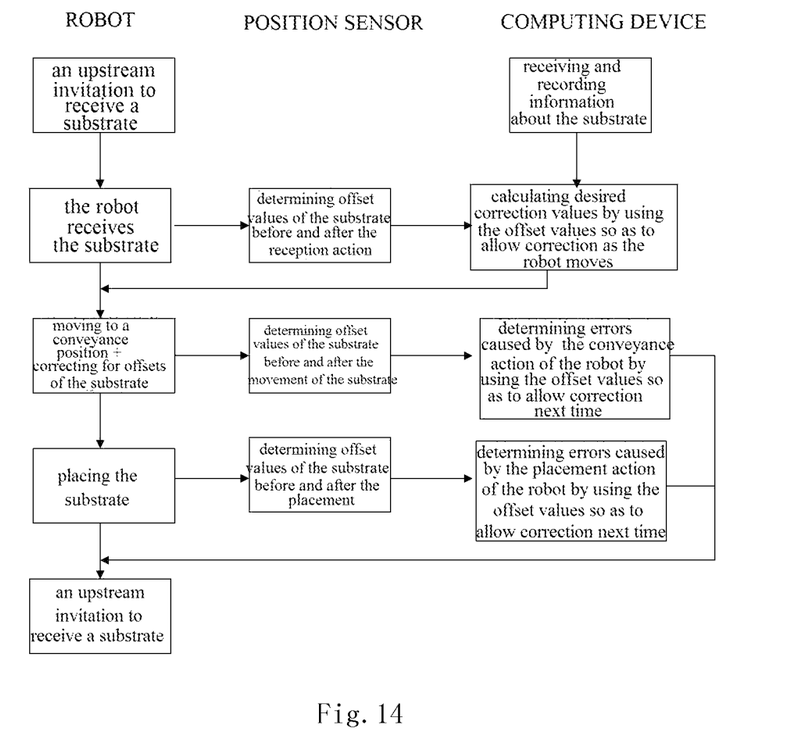
FIG. 14 shows a method for automatic correction of the substrate position by using the substrate conveying device according to another embodiment of the present disclosure.

FIG. 14 shows a method for automatic correction to the position of the substrate by using the substrate conveying device according to another embodiment of the present disclosure. The substrate conveying device is for example a robot. The robot receives a substrate in response to an upstream invitation. The reception action may cause vibration, which results in position deviation to the substrate. Position sensors on the robot automatically measure offset values for the position of the substrate before and after the reception action. A computing device can determine the offset values for the position of the substrate caused by the reception action of the robot based on the offset values of the position. The offset values can be transmitted to the robot so as to allow the robot to correct the offset values as it moves.

During the movement of the robot, vibration can also occur, which results in further position deviation of the substrate. The position sensors can measure the offset values of the position of the substrate before and after the movement of the robot, and the offset values can be transmitted to the robot so as to allow automatic correction at the next conveyance of the substrate.

The robot places the substrate after it conveys the substrate to the downstream device. During the placement, vibration may also be caused, which results in further position deviation of the substrate. Accordingly, the position sensors can measure the offset values of the substrate position before and after the placement action of the robot, and the offset values can be transmitted to the robot so as to allow automatic correction at the next conveyance of the substrate.

As can be seen from the method of FIG. 14, the substrate conveying device comprising the position sensor can measure in real time possible position deviation of the substrate caused during conveyance of the substrate, thereby allowing the robot to correct the deviation in real time or at the next conveyance.

In an optional embodiment, the computing device transmits the measured offset values of the substrate to a downstream device so as to allow correction of the offset values by the downstream device, instead of by the robot.

Therefore, the substrate conveying device comprising the position sensor greatly improves the accuracy in substrate conveyance, and enhances stability and robustness of the production line.

Although the operational principle of the conveying device of the present application is explained by taking a substrate as an example in the above embodiments, it should be realized that the conveying device of the present application can also be applied to any object other than a substrate, and correct the position of the object to be conveyed likewise.

What have been described above are only some embodiments of the present application, but the scope of the present application is not limited thereto. Any variation or substitution easily conceivable within the technical spirit disclosed in the present application for a skilled person who is familiar with the related technical field shall fall within the scope of the present application. Therefore, the scope of the present application shall be subject to the protection scope of the claims.

In the description of the present application, it should be understood that, directional or positional relations indicated by terms such as "up", "down", "inside" and "outside" are directional or positional relations shown based on the drawings. They are used only for facilitating description of the embodiments of the present application and simplifying the description, instead of indicating or implying that the indicated devices or elements must be orientated particularly, or constructed and operated in a particular orientation, so they cannot be understood as limiting the present application. The wording "comprise" or "comprising" does not exclude existence of elements or steps not listed in the claims. The wording "a" or "an" preceding an element cannot exclude existence of multiple such elements. The mere fact that certain measures are recited in mutually different dependent claims does not indicate that a combination of these measures cannot be used to advantage. No reference signs in the claims should be construed as limiting the scope.

The invention claimed is:

1. A position sensor, comprising at least two light emitters, a light receiver array and a pedestal, wherein the pedestal comprises a central plane and at least two sloping surfaces tilting towards the central plane of the pedestal at opposite edges, wherein each one of the sloping surfaces is provided with at least one of the at least two light emitters, and the light receiver array is arranged on the central plane of the pedestal, wherein the light emitters are configured to emit light waves having a same frequency perpendicular to respective sloping surfaces, such that the light waves from the light emitters interfere with each other before arriving at an object to be detected, wherein the light receiver array is configured to receive light wave components directly traveling downwards to the light receivers after the interference and/or light wave components reflected by the object to be detected above the position sensor, wherein a position of the object to be detected is determined based on positions of light receivers receiving sharp light waves between light receivers receiving low intensity light waves and light receivers receiving high intensity light waves in the light receiver array.

2. The position sensor according to claim 1, wherein the light emitters are configured to emit light waves having a same frequency perpendicular to respective sloping surfaces, such that the light waves from the light emitters interfere with each other before arriving at an object to be detected.

3. The position sensor according to claim 2, wherein the light receiver array is configured to receive light wave components directly traveling downwards to the light receivers after the interference and/or light wave components reflected by the object to be detected above the position sensor.

4. The position sensor according to claim 1, wherein the light emitters comprise columnar emitters.

5. A conveying device, comprising the position sensor according to claim 1 which is configured to detect an edge position of an object to be conveyed.

6. The conveying device according to claim 5, wherein the device is provided with at least three said position sensors, the at least three position sensors being arranged in two intersecting straight lines.

7. The conveying device according to claim 6, wherein the device comprises three said position sensors, two of them being configured to measure an offset of the object to be conveyed in a first direction, and the other being configured to measure an offset of the object to be conveyed in a second direction different from the first direction.

8. The conveying device according to claim 7, wherein two of the three position sensors are aligned with a standard position of an edge of the object to be conveyed on the device, and the other is aligned with a standard position of another edge of the object to be conveyed on the device.

9. The conveying device according to claim 7, wherein the conveying device is configured to make corresponding compensations by means of a movement trajectory of the conveying device during the conveyance based on the measured offsets.

10. The conveying device according to claim 5, wherein the conveying device is a robot having a robotic arm.

11. The position sensor according to claim 5, wherein the light emitters are configured to emit light waves having a same frequency perpendicular to respective sloping surfaces, such that the light waves from the light emitters interfere with each other before arriving at an object to be detected.

12. The position sensor according to claim 11, wherein the light receiver array is configured to receive light wave components directly traveling downwards to the light receivers after the interference and/or light wave components reflected by the object to be detected above the position sensor.

13. The position sensor according to claim 12, wherein a position of the object to be detected is determined based on positions of light receivers receiving sharp light waves between light receivers receiving low intensity light waves and light receivers receiving high intensity light waves in the light receiver array.

14. The position sensor according to claim 5, wherein the light emitters comprise columnar emitters.

15. A method for position correction of an object to be detected by using the position sensor according to claim 1, comprising steps of:
measuring offsets of at least three endpoints of the object to be detected by using the position sensor;
calculating by using the offsets of the at least three endpoints offset values and offset angles of the object to be detected as a whole in a first direction and in a second direction different from the first direction;
calculating compensation values for the offset values and the offset angles.

16. The method according to claim 15, wherein the position sensor is attached to a substrate conveying device, the object to be detected is a substrate, and the method further comprises:
measuring offsets of the position of the substrate by using the position sensor respectively before and after an action of receiving the substrate by the substrate conveying device, before and after a displacement of the substrate and/or before and after an action of placing the substrate.

17. The method according to claim 16, further comprising:
adding the compensation values to a movement trajectory of the substrate conveying device so as to allow correction by the substrate conveying device.

18. The method according to claim 15, further comprising:
transmitting the offset values and the offset angles to a downstream device to which the object to be detected will be conveyed so as to allow correction by the downstream device.

19. The method according to claim 15, wherein the offsets of the three endpoints are respectively $X_O1$, $X_O2$ and $Y_O$, and the offset values in a longitudinal direction and a transversal direction and the offset angle are respectively X, Y and θ, and the step of calculating the offset values and the offset angle involves the following formula:

$$X=(X_O1+X_O2)/2;\ Y=Y_O;\ \theta=(X_{O1}-X_{O2})/D,$$

wherein D is a distance between two position sensors configured to measure offsets of the object to be detected in the transversal direction.

* * * * *